US006962968B2

(12) United States Patent
Phelps et al.

(10) Patent No.: US 6,962,968 B2
(45) Date of Patent: Nov. 8, 2005

(54) PURIFICATION OF MACROCYCLIC OLIGOESTERS

(75) Inventors: Peter D. Phelps, Schenectady, NY (US); Timothy A. Thompson, Dresden (DE)

(73) Assignee: Cyclics Corporation, Schenectady, NY (US)

( * ) Notice: Subject to any disclaimer, the term of this patent is extended or adjusted under 35 U.S.C. 154(b) by 0 days.

(21) Appl. No.: 10/742,743

(22) Filed: Dec. 19, 2003

(65) Prior Publication Data

US 2004/0192879 A1 Sep. 30, 2004

Related U.S. Application Data

(60) Provisional application No. 60/435,621, filed on Dec. 20, 2002.

(51) Int. Cl.[7] .............................................. C08G 64/00
(52) U.S. Cl. ........................ 528/482; 521/27; 521/28; 521/30; 528/271; 528/272
(58) Field of Search ............................ 521/27, 29, 30; 528/271, 272, 482

(56) References Cited

U.S. PATENT DOCUMENTS

| | | | |
|---|---|---|---|
| 2,628,171 A | 2/1953 | Green | 106/271 |
| 2,669,713 A | 2/1954 | Osmun | 210/24 |
| 2,877,097 A | 3/1959 | Wolff | 23/205 |
| 3,018,272 A | 1/1962 | Griffing et al. | 260/75 |
| 3,090,753 A | 5/1963 | Matuszak et al. | 252/42.7 |
| 3,786,067 A | 1/1974 | Throckmorton et al. | 260/327 |
| 4,239,636 A | 12/1980 | Brois et al. | 508/305 |
| 4,417,062 A | 11/1983 | Brois et al. | 549/320 |
| 4,568,703 A | 2/1986 | Ashida | 521/124 |
| 4,568,756 A | 2/1986 | Brois et al. | 549/267 |
| 4,590,259 A | 5/1986 | Kosky et al. | 528/272 |
| 4,605,731 A | 8/1986 | Evans et al. | 528/371 |
| 4,616,077 A | 10/1986 | Silva | 528/371 |
| 4,638,077 A | 1/1987 | Brunelle et al. | 558/281 |
| 4,644,053 A | 2/1987 | Brunelle et al. | 528/371 |
| 4,680,345 A | 7/1987 | Kobayashi et al. | 525/437 |
| 4,705,635 A | 11/1987 | Knochel et al. | 210/633 |
| 4,727,134 A | 2/1988 | Brunelle et al. | 528/371 |
| 4,740,583 A | 4/1988 | Brunelle et al. | 528/370 |
| 4,757,132 A | 7/1988 | Brunelle et al. | 528/357 |
| 4,785,060 A | 11/1988 | Nagler | 525/444 |
| 4,803,288 A | 2/1989 | Kitamura et al. | 549/267 |
| 4,808,539 A | 2/1989 | Chapoteau et al. | 436/74 |
| 4,816,548 A | 3/1989 | Evans et al. | 528/370 |
| 4,829,144 A | 5/1989 | Brunelle et al. | 528/176 |
| 4,831,001 A | 5/1989 | Evans et al. | 502/153 |
| 4,851,524 A | 7/1989 | Brois et al. | 540/474 |
| 4,866,187 A | 9/1989 | Brois et al. | 549/320 |
| 4,888,411 A | 12/1989 | Shannon et al. | 528/199 |
| 4,900,706 A | 2/1990 | Sasaki et al. | 502/116 |
| 4,904,810 A | 2/1990 | Brunelle et al. | 558/281 |

(Continued)

FOREIGN PATENT DOCUMENTS

| | | |
|---|---|---|
| BE | 676324 | 6/1966 |
| CH | 654 604 A5 | 2/1986 |
| CN | 1120555 | 4/1996 |
| DE | 3607627 | 9/1987 |
| DE | 4034574 A1 | 5/1992 |
| EP | 0000544 | 8/1982 |
| EP | 0153785 A2 | 9/1985 |
| EP | 0216496 A2 | 4/1987 |
| EP | 0153785 B1 | 7/1989 |
| EP | 419254 A2 | 3/1991 |
| EP | 0 481 603 A1 | 4/1992 |
| EP | 486832 A2 | 5/1992 |
| EP | 264835 B1 | 6/1992 |
| EP | 235741 B1 | 1/1993 |
| EP | 543492 A1 | 5/1993 |
| EP | 589640 A1 | 3/1994 |
| EP | 598604 A1 | 5/1994 |
| EP | 601753 A1 | 6/1994 |
| EP | 635512 A1 | 1/1995 |
| EP | 655476 A1 | 5/1995 |
| EP | 436186 B1 | 10/1995 |

(Continued)

OTHER PUBLICATIONS

Processing KODAK Motion Picture Films, Module 5, "Chemical Recovery Procedures"; 1988 (24 pages) including pp. 5–3 to 5–23.

Magyani, Ofelia F., "Separation of Inorganic Anions and Carboxylic Acids Using Sulfonic Acids as Eluents"; PJS, vol. 125, No. 1, Jan.–Mar., 1996 http://www.stii.dost.gov.ph/pjsewb/data/sulfonic_acids.htm, downloaded Dec. 15, 2003 (1 page).

"Separation of Benzoic acid, Ethyl p–aminobenzoate, and Benzoin Using Ion–exchange Resins"; Feb. 1996; http://www.dartmouth.edu/~chemexp/Espt2.html, downloaded Dec. 16, 2003 (2 pages).

Technical Support Archives, "Sorbent Selection —SPE"; http://www.whatman.com/tech_support/archives/tech_archives_005.html, downloaded Dec. 15, 2003 (3 pages).

Ion Exchange—Resin Types, "Resin Types"; http://www.seperationprocess.com/Adsorption/AD_Chp04a.htm, downloaded Dec. 16, 2003(2 pages).

Fazio et al., "A novel synthesis of 2–deoxy–L–ribose", Tetrahedron: Asymmetry 11 (2000) pp. 1869–1876.

(Continued)

Primary Examiner—Terressa Boykin
(74) Attorney, Agent, or Firm—Goodwin Procter, LLP (57) ABSTRACT

Acid impurities, such as carboxylic acid-terminated polymers, are removed from macrocyclic oligoesters with ion exchange resins, resulting in macrocyclic oligoesters that are substantially free of acid impurities. The ion exchange resins can be regenerated anew and reused by washing the resins with various wash solutions. Macrocyclic oligoesters substantially free of acid impurities polymerize to much higher molecular weight polyesters than macrocyclic oligoesters containing acid impurities.

43 Claims, 2 Drawing Sheets

U.S. PATENT DOCUMENTS

| | | | |
|---|---|---|---|
| 4,909,846 A | 3/1990 | Barfurth et al. | 106/22 |
| 4,980,453 A | 12/1990 | Brunelle et al. | 528/352 |
| 4,992,228 A | 2/1991 | Heck et al. | 264/135 |
| 4,999,420 A | 3/1991 | Leitz et al. | 528/371 |
| 5,006,637 A | 4/1991 | Guggenheim et al. | 528/35 |
| 5,023,346 A | 6/1991 | Schon et al. | 549/231 |
| 5,039,717 A | 8/1991 | Kawakami et al. | 523/100 |
| 5,039,783 A | 8/1991 | Brunelle et al. | 528/272 |
| 5,071,711 A | 12/1991 | Heck et al. | 428/542.8 |
| 5,095,088 A | 3/1992 | Wang | 528/203 |
| 5,097,008 A | 3/1992 | Krabbenhoft et al. | 528/371 |
| 5,116,900 A | 5/1992 | Flautt et al. | 524/377 |
| 5,124,362 A | 6/1992 | Auerswald et al. | 521/26 |
| 5,191,013 A | 3/1993 | Cook et al. | 524/601 |
| 5,191,038 A | 3/1993 | Krabbenhoft et al. | 525/462 |
| 5,202,386 A | 4/1993 | Hogt et al. | 525/298 |
| 5,207,850 A | 5/1993 | Parekh | 156/166 |
| 5,214,158 A | 5/1993 | Brunelle et al. | 549/267 |
| 5,225,129 A | 7/1993 | van den Berg | 264/85 |
| 5,231,161 A | 7/1993 | Brunelle et al. | 528/272 |
| 5,237,042 A | 8/1993 | Kim et al. | 528/279 |
| 5,241,880 A | 9/1993 | Mizobata et al. | 74/502.5 |
| RE34,431 E | 11/1993 | Brunelle et al. | 528/352 |
| 5,264,548 A | 11/1993 | Brunelle et al. | 528/370 |
| 5,281,669 A | 1/1994 | Kambour et al. | 525/177 |
| 5,288,837 A | 2/1994 | Munjal et al. | 528/198 |
| 5,300,392 A | 4/1994 | Odell et al. | 430/130 |
| 5,300,393 A | 4/1994 | Odell et al. | 430/134 |
| 5,300,590 A | 4/1994 | Cook et al. | 525/444 |
| 5,302,484 A | 4/1994 | Odell et al. | 430/127 |
| 5,308,496 A | 5/1994 | Pease et al. | 210/674 |
| 5,314,779 A | 5/1994 | Odell et al. | 430/127 |
| 5,321,117 A | 6/1994 | Brunelle | 528/272 |
| 5,340,909 A | 8/1994 | Doerr et al. | 528/276 |
| 5,348,985 A | 9/1994 | Pearce et al. | 521/124 |
| 5,356,984 A | 10/1994 | Carbone et al. | 524/431 |
| 5,386,037 A | 1/1995 | Takekoshi et al. | 549/206 |
| 5,387,666 A | 2/1995 | Takekoshi et al. | 528/283 |
| 5,389,719 A | 2/1995 | Takekoshi et al. | 524/784 |
| 5,407,984 A | 4/1995 | Brunelle et al. | 524/178 |
| 5,410,014 A | 4/1995 | Haese et al. | 528/196 |
| 5,415,807 A | 5/1995 | Gosselink et al. | 8/137 |
| 5,420,226 A | 5/1995 | Hamer et al. | 528/201 |
| 5,434,244 A | 7/1995 | Warner et al. | 528/490 |
| 5,446,122 A | 8/1995 | Warner et al. | 528/279 |
| 5,466,744 A | 11/1995 | Evans et al. | 524/714 |
| 5,498,651 A | 3/1996 | Brunelle | 524/176 |
| 5,519,108 A | 5/1996 | Yuo et al. | 528/287 |
| 5,527,976 A | 6/1996 | Takekoshi et al. | 585/16 |
| 5,530,052 A | 6/1996 | Takekoshi et al. | 524/447 |
| 5,591,800 A | 1/1997 | Takekoshi et al. | 524/783 |
| 5,594,090 A | 1/1997 | Miyazaki et al. | 528/265 |
| 5,605,979 A | 2/1997 | Priddy, Jr. et al. | 525/439 |
| 5,637,655 A | 6/1997 | Priddy, Jr. et al. | 525/438 |
| 5,646,306 A | 7/1997 | Elsasser, Jr. | 549/267 |
| 5,648,454 A | 7/1997 | Brunelle | 528/491 |
| 5,654,395 A | 8/1997 | Jackson et al. | 528/308.3 |
| 5,661,214 A | 8/1997 | Brunelle et al. | 524/783 |
| 5,663,282 A | 9/1997 | Todt et al. | 528/274 |
| 5,668,186 A | 9/1997 | Brunelle et al. | 521/48 |
| 5,693,722 A | 12/1997 | Priddy, Jr. et al. | 525/439 |
| 5,700,888 A | 12/1997 | Hall | 526/190 |
| 5,707,439 A | 1/1998 | Takekoshi et al. | 106/483 |
| 5,710,086 A | 1/1998 | Brunelle et al. | 502/171 |
| 5,756,644 A | 5/1998 | Hodge et al. | 528/272 |
| 5,759,826 A | 6/1998 | Ahlers et al. | 435/136 |
| 5,760,161 A | 6/1998 | Goins, Jr. et al. | 528/299 |
| 5,786,440 A | 7/1998 | Kohler et al. | 528/196 |
| 5,795,423 A | 8/1998 | Johnson | 156/166 |
| 5,830,541 A | 11/1998 | Carswell et al. | 427/475 |
| 5,936,029 A | 8/1999 | Hall | 524/572 |
| 5,968,642 A | 10/1999 | Saito | 428/304.4 |
| 6,001,891 A | 12/1999 | Higuchi et al. | 522/104 |
| 6,080,834 A | 6/2000 | Putzig et al. | 528/279 |
| 6,121,466 A | 9/2000 | Osterholt et al. | 549/267 |
| 6,124,412 A | 9/2000 | Bin-Taleb et al. | 526/159 |
| 6,229,046 B1 | 5/2001 | Eyal et al. | 562/589 |
| 6,284,868 B1 | 9/2001 | Geprägs et al. | 528/392 |
| 6,297,330 B1 | 10/2001 | Burch, Jr. et al. | 525/444 |
| 6,320,077 B1 | 11/2001 | Eyal et al. | 562/589 |
| 6,353,030 B1 | 3/2002 | Prikoszovich | 614/772.1 |
| 6,369,157 B1 | 4/2002 | Winckler et al. | 524/783 |
| 6,376,026 B1 | 4/2002 | Correll et al. | 427/512 |
| 6,399,549 B1 | 6/2002 | Taylor et al. | 508/479 |
| 6,414,103 B1 | 7/2002 | Correll et al. | 528/25 |
| 6,420,047 B2 | 7/2002 | Winckler et al. | 428/480 |
| 6,420,048 B1 | 7/2002 | Wang | 428/480 |
| 6,436,548 B1 | 8/2002 | Phelps | 428/480 |
| 6,436,549 B1 | 8/2002 | Wang | 428/480 |
| 6,458,972 B1 | 10/2002 | Surburg et al. | 549/266 |
| 6,525,164 B2 | 2/2003 | Faler | 528/279 |
| 6,534,679 B2 | 3/2003 | Eyal et al. | 562/589 |
| 6,583,093 B2 | 6/2003 | Taylor et al. | 508/479 |
| 6,586,558 B2 | 7/2003 | Schmidt et al. | 528/271 |
| 6,639,009 B2 | 10/2003 | Winckler et al. | 524/783 |
| 2004/0101688 A1 * | 5/2004 | Rubinsztajn et al. | 428/413 |

FOREIGN PATENT DOCUMENTS

| | | |
|---|---|---|
| EP | 688778 A1 | 12/1995 |
| EP | 0714926 A2 | 6/1996 |
| EP | 699701 A3 | 9/1996 |
| EP | 0798336 A2 | 1/1997 |
| FR | 2 530 628 | 1/1984 |
| GB | 544853 | 4/1942 |
| GB | 798412 | 8/1954 |
| GB | 957841 | 5/1964 |
| GB | 991020 | 5/1965 |
| GB | 1044205 | 9/1966 |
| GB | 1108921 | 4/1968 |
| GB | 1273225 | 5/1972 |
| GB | 1349324 | 4/1974 |
| GB | 2 123 405 A | 2/1984 |
| GB | 2 278 069 | 11/1994 |
| JP | 4621873 | 6/1971 |
| JP | 476425 | 10/1972 |
| JP | 57-122078 A | 7/1982 |
| JP | 6275547 | 4/1987 |
| JP | 62141063 A | 6/1987 |
| JP | 02298512 | 12/1990 |
| JP | 4253764 | 9/1992 |
| JP | 08-093594 | 4/1996 |
| JP | 09-110832 | 4/1996 |
| JP | 09048876 | 2/1997 |
| JP | 09-238806 | 9/1997 |
| JP | 10-069915 | 3/1998 |
| JP | 10-194262 | 7/1998 |
| JP | 63156824 A | 11/1998 |
| JP | 11-136942 | 5/1999 |
| JP | 2001031846 | 2/2001 |
| JP | 2002293902 | 10/2002 |
| JP | 2002293903 | 10/2002 |
| JP | 2002308969 | 10/2002 |
| JP | 2002317041 | 10/2002 |
| JP | 02320499 | 11/2002 |
| JP | 02322272 | 11/2002 |
| JP | 02338672 | 11/2002 |
| JP | 2003082081 | 3/2003 |
| SU | 1077893 | 3/1984 |
| SU | 1532560 A1 | 12/1989 |
| WO | 88/06605 | 9/1988 |
| WO | 91/09899 | 7/1991 |

| WO | 93/04106 | 3/1993 |
| --- | --- | --- |
| WO | 95/00574 | 1/1995 |
| WO | 95/30702 | 11/1995 |
| WO | 96/22319 | 7/1996 |
| WO | 99/25485 | 5/1999 |
| WO | 00/27632 | 5/2000 |
| WO | 00/38897 | 7/2000 |
| WO | 01/53379 A1 | 7/2001 |
| WO | 01/56694 A1 | 8/2001 |
| WO | 02/18476 A2 | 3/2002 |
| WO | 02/22738 A2 | 3/2002 |
| WO | 02/098946 A1 | 12/2002 |
| WO | 03/031496 A1 | 4/2003 |

OTHER PUBLICATIONS

Wakui et al., "Extraction of Arsenic(III) with Macroporous Resin Impregnated with Bis(2–ethylhexyl)ammonium Bis(2–ethylhexyl)–dithiocarbamate", Analytical Sciences, Apr. 1988, vol. 14, pp. 299–303.

Grant et al., "Colour removal from Pulp Mill Effluents Using Immobilized Horseradish Peroxidase", Sustainable Forest Management Network Project Report, Jun. 2000(22 pages).

Vera Calle et al., "Deacidification of the clarified passion fruit juice", Desalination 149 (2002) pp. 357–361.

"Sugar Applications (This page lists the principal applications of ion exchange resins in the sugar and sweets industry)", http://www.rohmhaas.com/ionexchange/sugarapp.htm, downloaded Dec. 16, 2003 (3 pages).

Amberlite® FPA53 Food Grade Weak Base Anion Exchanger, "For the Treatment of Sweeteners and Organic Acids", (2001) (2 pages).

Patent Cooperation Treaty, International Search Report, International Application No. PCT/US03/40368, mailed on Apr. 21, 2004 (8 pages).

U.S. Appl. No. 10/102,162, filed Mar. 20, 2002, Wang et al.

U.S. Appl. No. 10/040,530, filed Jan. 7, 2002, Wang.

U.S. Appl. No. 09/974,722, Aug. 31, 2001, Phelps et al.

U.S. Appl. No. 09/945,233, Aug. 31, 2001, Faler.

U.S. Appl. No. 09/906,385, filed Jul. 16, 2001, Wang.

U.S. Appl. No. 09/754,943, filed Jan. 4, 2001, Winckler et al.

U.S. Appl. No. 09/659,975, filed Sep. 12, 2000, Phelps.

Ahjopalo, L. et al. (2000) "Cyclic Oligomers in Saturated Polyesters" Polymer, vol. 41, No. 23, 8283–8290.

Beach, A. Christopher G. "The Preparation of Mirrors by Sputtering Metals onto Glass Surfaces," A. Inst. P., Chelsea Polytechnic, M.S. received, Mar. 17, 1930.

Brunelle (1995) "Macrocycles For The Synthesis of High Molecular Weight Polymers" pp. 197–235, ch. 6, New Methods of Polymer Synthesis: vol. 2, edited by J.R. Ebdon and G.C. Eastmond.

Brunelle et al. (1997) "Semi–crystalline Polymers via Ring–Opening Polymerization: Preparation and Polymerization of Alkylene Phthalate Cyclic Oligomers" Polymers Preprints vol. 38, No. 2, pp. 381–382.

Brunelle et al. (1998) "Semicrystalline Polymers via Ring–Opening Polymerization: Preparation and Polymerization: Preparation and Polymerization of Alkylene Phthalate Cyclic Oligomers" Macromolecules vol. 31, No. 15, 4782–4790.

Burch, R.R. et al. (2000) "Synthesis of Cyclic Oligoesters and Their Rapid Polymerization to High Molecular Weight" Macromolecules, vol. 33, No. 14, 5053–5064.

Chisholm et al. "Syntheses and structural characterization of 2,2'–ethylene–bis(6–t–butyl–4–methyl–phenoxide) complexes of titanium, zirconium and tantalum, " Polyhedron, vol. 16, No. 17, (1997) pp. 2941–2949.

Cotton, N. et al. (1993) "Rate and Extent of Supercritical Fluid Extraction of Cyclic Trimer from Poly(Ethylene Terephthalate) at Elevated Temperatures" Journal of Chromatographic Science, vol. 31, No. 5, 157–161.

Cussler et al. "Barrier Membranes," Journal of Membrane Science, 38 (1998) pp. 161–174.

Durfee et al. "Chemical and Electrochemical Reduction of Titanium (IV) Aryloxides," Inorganic Chemistry, 24 (1985) pp. 4569–4573.

Fantacci et al. "Density Functional Study of Tetraphenolate and Calix[4]arene Complexes of Early Transition Metals," Inorganic Chemistry, 70 (2001) pp. 1544–1549.

Fukushima et al. "Graphite Nanoplatelets as Reinforcements for Polymers: Structural, Electrical and Thermal Properties," Proc. 2nd Ann., Automotive Comp. Conf., Soc. Plast. Eng., Sep. 2002, 7 pgs.

Fukushima et al. "Synthesis of an Intercalated Compound of Montmorillonite and 6–Polyamide," Journal of Inclusion Phenomena, 5 (1987) pp. 473–482.

Hall et al. "Recent research on the synthesis and applications of cyclic oligomers," Reactive & Functional Polymers, 41 (1999), pp. 133–139.

Hamb et al. "Synthesis of Cyclic Tris(Ethylene Terephthalate)," Polymer Letters, 5 (1967), pp. 1057–1058.

Hamilton et al. (1998) "Cyclic Polyesters: Part 8. Preparation and Characterization of Cyclic Oligomers in Six Aromatic Ester and Ether–Ester Systems" Polymer vol.39, No. 14., 3241–3252.

Harrison, A. G. et al. (1997) "Analysis of cyclic oligomers of poly(ethylene terephthalate) by liquid chromatography/mass spectrometry" Polymer Communications, vol. 38, No. 10, 2549–2555.

Henshaw et al. (1994) "Recycling of a Cyclic Thermoplastic Composite Material by Injection and Compression Molding" J. of Thermoplastic Composite Materials vol. 7 (1), 14–29.

Hubbard, P.A. (1996) "Polyesters via Macrocyclic Oligomers" Dissertation presented at the University of Akron.

Kricheldorf, H.R. et al. (1997) "Macrocycles IV. Macrocyclic Polylactones as Bifunctional Monomers for Polycondensations" Journal of Polymer Science, vol. 36, No. 9, 1373–1378.

Kricheldorf, H.R. et al. (1998) "Macrocycles. 3. Telechelic Polylactones via Macrocyclic Polymerization" Macromolecules, vol. 31, No. 3, 614–620.

Lattimer et al. (1998) "MALDI–MS Analysis of Pyrolysis Products From a Segmented Polyurethane" Journal of Analytical and Applied Pyrolysis, vol. 48, 1–15.

Lui et al. (1999) "Preparation of Cyclic Polyester Oligomers and Ultra–Low VOC Polyester Coatings" Polymer Reprints, vol. 40, No. 1, pp. 137–138.

Martin et al. (1987) "Pultrusion", Engineered Materials Handbook: vol. 1 Composites, pp. 533–543.

Miller, S. (1998) "Macrocyclic polymers from cyclic oligomers of poly(butylene terephthalate)" Dissertation Presented at University of Massachusetts, Amherst, MA US.

Mueller, F.J. et al. (1983) "Synthesis of Cyclic Oligomers of Butylene Terephthalate" Makromol. Chem., vol. 184, No. 12, 2487–95.

Mueller, F.J. et al. (1983) "Synthesis of Cyclic Oligomers of Butylene Terephthalate" *Makromol. Chem.*, vol. 184, No. 12, 2487–95. (Translation).

Okuda et al. "Synthesis and Characterization of Mononuclear Titanium Complexes Containing a Bis(phenoxy) Ligand Derived from 2-2'-Methylene–bis(6–*tert*–butyl–4–methylphenol)," *Chem. Ber.*, vol. 128, (1995) pp. 221–227.

Perovic, A. (1985) "Morphological Instability of poly(ethylene terephthalate) cyclic oligomer crystals" *Journal of Material Science*, vol. 20, Iss. 4, 1370–1374.

Perovie et al. (1982) "Crystallization of Cyclic Oligomers in Commercial Poly(ethleneterephthalate) Films" *Polymer Bulletin* vol. 6, 277–283.

Roelens, S. (1988) "Organotin–Mediated Synthesis of Macrocyclic Polyesters: Mechanism and Selectivity in the Reaction of Dioxastannolanes with Diacyl Dichlorides" *Journal of the Chemical Society, Perkin Transactions 2*, vol. 8, 1617–1625.

Ruddick et al. "A new method for the polymer–suported synthesis of cyclic oligoesters for potential applications in macrocyclic lactone synthesis and combinatorial chemistry," *J.Chem. Soc., Perkin Trans. I*, 2002, pp. 627–637.

Spanagel et al. "Macrocyclic Esters," Contribution No. 153 from The Experimental Station of E.I. duPont deNemours & Company, vol. 57, pp. 929–934.

Toth et al. "Towards supported catalyst models: the synthesis, characterization, redox chemistry, and structures of the complexes Ti(Oar')$_4$(Ar'=C$_6$H$_4$(2–*t*–Bu), C$_6$H(2,3,5, 6–Me)$_4$)," *Canadian Journal of Chemistry*, vol. 6, (1991) pp. 172–178.

Uhi et al. "Flame Retarduncy of Graphite Nanocomposites," *Polym. Mater. Sci. Eng.* 83:56(2000).

Usuki et al. "Swelling behavior of montmorillonite cation exchanged for ω–amino acids by ∈–caprolactam," *J. Mater. Res.*, vol. 8, No. 5, May 1993, pp. 1174–1178.

Usuki et al. "Synthesis of nylon 6–clay hybrid," J. Mater. Res., vol. 8, No. 5, May 1993, pp. 1179–1184.

Ward et al. "Gas barrier improvement using vermiculite and mica in polymer films," *Journal of Membrane Science*, 55 (1991) pp. 173–180.

Xiao et al. "Preparation of exfoliated graphite/polystyrene composite by polymerization–filling technique," *Polymer*, 42 (2001) pp 4813–4816.

Youk et al. "Polymerization of Ethylene Terephthalate Cyclic Oligomers with Antimony Trioxide," *Macromolecules*, 33 (2000), pp. 3594–3599.

* cited by examiner

PURIFICATION OF MACROCYCLIC OLIGOESTERS

This application claims priority to U.S. Provisional Patent Application Ser. No. 60/435,621 filed on Dec. 20, 2002, the entire contents of which are incorporated by reference herein.

TECHNICAL FIELD

The invention generally relates to methods for purification of macrocyclic oligoesters. More particularly, the invention relates to methods for removing acid impurities (e.g., carboxylic acid-terminated polymers) from macrocyclic oligoesters using basic ion exchange resins.

BACKGROUND INFORMATION

Linear polyesters such as poly(alkylene terephthalate) are generally known and commercially available where the alkylene typically has 2 to 8 carbon atoms. Linear polyesters have many valuable characteristics including strength, toughness, high gloss, and solvent resistance. Linear polyesters are conventionally prepared by the reaction of a diol with a dicarboxylic acid or its functional derivative, typically a diacid halide or ester. Linear polyesters may be fabricated into articles of manufacture by a number of known techniques including extrusion, compression molding, and injection molding.

Recently, macrocyclic oligoesters were developed that have unique properties that make them attractive for a variety of applications, including as matrices for engineering thermoplastic composites. Macrocyclic oligoesters exhibit low melt viscosity, for example, allowing them easily to impregnate a dense fibrous preform followed by polymerization to polymers. Furthermore, certain macrocyclic oligoesters melt and polymerize at temperatures well below the melting point of the resulting polymer. Upon melting and in the presence of an appropriate catalyst, polymerization and crystallization can occur virtually isothermally.

Macrocyclic oligoesters prepared from depolymerzation of polyester linears in the presence of a depolymerizaing catalyst typically do not re-polymerize to form high molecular weight polyesters (HMWPs) because macrocyclic oligoesters prepared by depolymerization contain small amount of acid impurities, i.e., acidic impurities such as carboxylic acid-terminated species. The carboxylic acid-terminated species, e.g., carboxylic acid-terminated monomers, oligomers, and polymers, inhibit macrocyclic oligoesters from polymerizing to HMWPs. Macrocyclic oligoesters are usually prepared from depolymerization of polyester linears. It can be useful, therefore, to remove such carboxylic acid-terminated oligomers to allow formation of HMWPs.

Common acid absorbents, such as basic alumina, carbon, silica or molecular sieves, have been employed to remove acid impurities from macrocyclic oligoesters. See, e.g., U.S. Pat. No. 5,434,244. Generally, protonated molecular sieves have pores sizes that allow polar groups of impurities to be subjected to the protonated sites. A solution of a macrocyclic oligoester may be contacted with the protonated molecular sieves to remove impurities, which are adsorbed by the protonated sites in the molecular sieves. Typically, about 15 g to 100 g of protonated molecular sieves are needed to purify every gram of impurity from macrocyclic oligoesters. Since molecular sieves absorb acid slowly, large columns and slow flow rates are typically needed which makes the cost of using molecular sieves prohibitively high and the production efficiency low. There is not an efficient and effective way to regenerate molecular sieves that must be discarded after use.

Other techniques of removing acid impurities include passing a solution of macrocyclic oligoesters containing acidic species over beds of activated basic alumina. Alumina is effective at acid absorption, but alumina is also expensive and must be discarded after removal of the acidic species from the solution. Use of alumina thus requires both new materials and material disposal. Typically, one part by weight alumina can absorb acid impurities contained in about 10–20 parts of macrocyclic oligoester before fresh alumina is required.

SUMMARY OF THE INVENTION

Purifying macrocyclic oligoesters with ion exchange resins and optionally regenerating the resins after use is more efficient and economical than existing techniques. Ion exchange resins are effective at removing acid impurities contained in macrocyclic oligoesters, are readily available at relatively low cost, and can be regenerated and used again. Additionally, purification processes using ion exchange resins may be designed to remove acid impurities from macrocyclic oligoesters in a continuous process, offering the benefit of scaled-up production.

In one aspect, the invention generally relates to a method for removing acid impurities from macrocyclic oligoesters. Methods of the invention are useful for removing acid impurities resulting from synthesizing and/or depolymerizing macrocyclic oligoesters. Macrocyclic oligoesters may be prepared from monomers, oligomers, and polymers including but not limited to: epoxy, melamine-formaldehyde, phenol-formaldehyde, polyacrylonitrile, polyamide-imide, polybutadiene, polybutylene terephthalate, polycarbonate, polychloroprene, polychlorotrifluoroethylene, polydimethyl siloxane, polyethereketone, polyethylene, polyethylene terephthalate, polyhexamethylene adipamide, polyimide, polyisobutylene, cis-polyisoprene, polymethyl methacrylate, polyphenylene oxide, polyphenylene sulfide, polyparaphenylene terephthalamide, polypropylene, polystyrene, polytetrafluoroethylene, polyvinyl acetate, polyvinyl alcohol, polyvinyl chloride, polyvinyl fluoride, polyvinylidene chloride, and polyvinylidene fluoride. For example, acid impurities, such as carboxylic acid-terminated (e.g., —COOH terminated) monomeric species, carboxylic acid-terminated oligomeric species, and carboxylic acid terminated polymeric species, may be removed from a solution of a macrocyclic oligoester. In one embodiment, the method includes the step of contacting a macrocyclic oligoester solution containing an acidic impurity with a basic ion exchange resin. Depending on the source and work-up procedures, the solution may contain reaction products from a depolymerization reaction of linear polyesters and a catalyst (e.g., macrocyclic oligoesters and various acid impurities such as carboxylic acid-terminated linear polyesters, and solvents such as o-dichlorobenzene (o-DCB)). The method may further include a step of regenerating the ion exchange resin that previously contacted acid impurities, for example, by contacting the ion exchange resin with a wash solution.

In another aspect, the invention generally features a method of preparing a macrocyclic oligoester. In one embodiment, the method includes the step of providing a solution of a macrocyclic oligoester, which often is a worked-up reaction solution containing the desired macrocyclic oligoesters and one or more species of acid impurities. The solution of macrocyclic oligoester is contacted with a basic ion exchange resin, and a macrocyclic oligoester substantially free of acid impurities is collected. Some or all of the acid impurities may be carboxylic acid-terminated polymers, e.g., carboxylic acid-terminated linear polyesters. Examples of macrocyclic oligoesters include macrocyclic oligoesters of 1,4-butylene terephthalate, ethylene terephthalate, and a macrocyclic co-oligoester. One example of an acid impurity removed from a solution of a macrocyclic oligoester is terephthalic acid. Other acid impurities that may be removed from a solution of a macrocyclic oligoester include, for example:

where $x \geq 1$ and where R is an alkyl group.

In yet another aspect, the invention generally features a method of preparing a macrocyclic oligoester. In one embodiment, the method includes the step of contacting a linear polyester with a depolymerization catalyst in an organic solution to produce a solution of macrocyclic oligoester. The solution typically contains one or more species of carboxylic acid-terminated monomers, oligomers or polymers. Following typically work-up such as filtration, the solution then is contacted with a basic ion exchange resin, which removes the acid impurities. Consequently, a macrocyclic oligoester substantially free of acid impurities results and can be collected for further isolation of pure macrocyclic oligoesters.

In yet another aspect, the invention generally features a method of preparing a macrocyclic oligoester. In one embodiment, the method includes the step of providing a solution of a macrocyclic oligoester typically from a depolymerization reaction. For example, a linear polyester, e.g., poly(1,4-butylene terephthalate) or poly(ethylene terephthalate), may be contacted with a tin or titanate catalyst to produce a solution of a macrocyclic oligoester. The solution typically contains one or more species of carboxylic acid-terminated monoesters, oligoesters, or polyesters. The solution is contacted with a basic ion exchange resin, e.g., a tertiary amine-functionalized polyacrylate resin or a tertiary amine-functionalized polystyrene resin, to produce a macrocyclic oligoester that is substantially free of carboxylic acid-terminated monoesters, oligoesters, or polyesters.

In still another aspect, the invention generally features a method of regenerating an ion exchange resin. In one embodiment, a basic ion exchange resin that previously was used to remove an acidic impurity is contacted with a wash solution. The wash purifies the basic ion exchange resin so that it becomes substantially free of the acidic impurity that was previously adsorbed on the resin. The basic ion exchange resin typically is weakly basic such as a resin of tertiary amine-functionalized polystyrene or tertiary amine-functionalized polyacrylate.

For regeneration, the ion exchange resin may be washed with a single wash solution or with multiple wash solutions in a series of post wash steps, i.e., post acid removal washes. The wash solution may contain a base, e.g., triethylamine, sodium hydroxide or potassium hydroxide. The wash solution may also be a solvent, e.g., methanol or o-DCB. Typically, an effective regeneration can be achieved by multiple washings of the resins with both basic solutions and solvents.

The foregoing, and other features and advantages of the invention, as well as the invention itself, will be more fully understood from the description, drawings, and claims, which follow.

DESCRIPTION

Surprisingly, ion exchange resins effectively remove acid impurities from solutions containing macrocyclic oligoesters. Additionally, ion exchange resins containing acid impurities may be regenerated anew and used again. Consequently, when two or more beds or columns of ion exchange resin are used concurrently, impurity removal may be conducted continuously with one ion exchange resin bed while a second ion exchange resin bed is regenerated. Regenerating ion exchange resins reduces solid waste and is more economical than other impurity removal techniques, such as beds of alumnia, which must be discarded after use. Furthermore, the manufacturer can control the desired purity of the macrocyclic oligoesters by selecting appropriate resin regeneration cycles.

Ion-exchange resins typically are synthetic insoluble cross-linked polymers carrying acidic or basic side-groups which have high exchange capacity. An ion exchange resin may be selected depending on particular macrocyclic oligoester to be purified, the impurities to be removed, and/or the amount and concentration of materials. Also, the type of resin, e.g., gel or macroporous, acrylic or styrene, the resin bead size, the amount of resin used in the bed or column, and the selectivity and the kinetics of impurity removal may be selected and/or controlled to suit an individual application.

For example, the affinity of the ion exchange resin, i.e., whether the resin is basic or weakly basic, can be chosen based on the impurities of a particular application.

Definitions

The following general definitions may be helpful in understanding the various terms and expressions used in this specification.

As used herein, a "macrocyclic" molecule means a cyclic molecule having at least one ring within its molecular structure that contains 8 or more atoms covalently connected to form the ring.

As used herein, an "oligomer" means a molecule that contains 2 or more identifiable structural repeat units of the same or different formula.

As used herein, an "oligoester" means a molecule that contains 2 or more identifiable ester functional repeat units of the same or different formula.

As used herein, a "macrocyclic oligoester" means a macrocyclic oligomer containing 2 or more identifiable ester functional repeat units of the same or different formula. A macrocyclic oligoester typically refers to multiple molecules of one specific formula having varying ring sizes. However, a macrocyclic oligoester may also include multiple molecules of different formulae having varying numbers of the same or different structural repeat units. A macrocyclic oligoester may be a co-oligoester or a higher order oligoester, i.e., an oligoester having two or more different structural repeat units having an ester functionality within one cyclic molecule.

As used herein, "an alkylene group" means —$C_nH_{2n}$—, where $n \geq 2$.

As used herein, "a cycloalkylene group" means a cyclic alkylene group, —$C_nH_{2n-x}$—, where x represents the number of H's replaced by cyclization(s).

As used herein, "a mono- or polyoxyalkylene group" means [—$(CH_2)_m$—O—]$_n$—$(CH_2)_m$—, wherein m is an integer greater than 1 and n is an integer greater than 0.

As used herein, "a divalent aromatic group" means an aromatic group with links to other parts of the macrocyclic molecule. For example, a divalent aromatic group may include a meta- or para-linked monocyclic aromatic group (e.g., benzene).

As used herein, "an alicyclic group" means a non-aromatic hydrocarbon group containing a cyclic structure therein.

Macrocyclic Oligoesters

Macrocyclic oligoester solutions and macrocyclic co-oligoester solutions prepared according to synthesis, condensation, and, in particular, according to depolymerization methods, may contain acid impurities. Acid impurities, even in trace amount, e.g., less than about 1%, inhibit macrocyclic oligoesters from polymerizing to high molecular weight polyesters (HMWPs). In particular, trace amounts of carboxylic acid-terminated polyesters present in macrocyclic oligoester solutions prepared by depolymerization inhibit macrocyclic oligoesters from polymerizing to form HMWPs.

Macrocyclic oligoesters that may be purified according to methods described herein include, but are not limited to, macrocyclic poly(alkylene dicarboxylate) oligomers typically having a structural repeat unit of the formula:

(I)

wherein R is an alkylene, a cycloalkylene, or a mono- or polyoxyalkylene group; and A is a divalent aromatic or alicyclic group.

Preferred macrocyclic oligoesters are macrocyclic oligoesters of 1,4-butylene terephthalate, 1,3-propylene terephthalate, 1,4-cyclohexylenedimethylene terephthalate, ethylene terephthalate, propylene terephthalate, and 1,2-ethylene 2,6-naphthalenedicarboxylate, and macrocyclic co-oligoesters comprising two or more of the above structural repeat units.

Synthesis of the macrocyclic oligoesters may be achieved by contacting at least one diol of the formula HO—R—OH with at least one diacid chloride of the formula:

(II)

where R and A are as defined above. The reaction typically is conducted in the presence of at least one amine that has substantially no steric hindrance around the basic nitrogen atom. An illustrative example of such amines is 1,4-diazabicyclo[2.2.2]octane (DABCO). The reaction usually is conducted under substantially anhydrous conditions in a substantially water immiscible organic solvent such as methylene chloride. The temperature of the reaction typically is within the range of from about −25° C. to about 25° C. See, e.g., U.S. Pat. No. 5,039,783 to Brunelle et al.

Macrocyclic oligoesters also can be prepared via the condensation of a diacid chloride with at least one bis(hydroxyalkyl) ester such as bis(4-hydroxybutyl) terephthalate in the presence of a highly unhindered amine or a mixture thereof with at least one other tertiary amine such as triethylamine. The condensation reaction is conducted in a substantially inert organic solvent such as methylene chloride, chlorobenzene, or a mixture thereof. See, e.g., U.S. Pat. No. 5,231,161 to Brunelle et al.

Another method for preparing macrocyclic oligoesters or macrocyclic co-oligoesters is the depolymerization of linear polyester polymers in the presence of an organotin or titanate compound. In this method, linear polyesters are converted to macrocyclic oligoesters by heating a mixture of linear polyesters, a transesterification catalyst, e.g., a tin or titanate compound, and an organic solvent.

Linear polyesters that may be depolymerized according to this method include poly(alkylene dicarboxylates), polymeric glycol terephthalates or isophthalates and mixtures thereof including copolyesters of terephthalic and isophthalic acids. The polyester linears may be prepared by the alcoholysis of esters of phthalic acid with a glycol and subsequent polymerization, which is achieved by heating the resulting mixture in the presence of a transesterification catalyst.

Suitable organic solvents include those having a minimum boiling point of at least about 110° C., such as, for example, xylene, chlorobenzene, naphthalene, toluene, tetramethylbenzene, methylnaphthalene, o-xylene, o-dichlorobenzene, and mixtures thereof. The amount of solvent and reaction temperature influence the dissolution and subsequent depolymerization of the polyester linears. The solvent that is employed in the depolymerization reaction is typically substantially free from oxygen and water. For example, the solvent may be sparged to drive out oxygen and water. Sparging may occur at any time before catalyst addition.

Tin or titanate catalysts may be used in a solid or solution form. Generally, the amount of tin or titanate catalyst used ranges from about 1.0 to about 5.0 mole percent of polyester monomer units.

When the solvent is substantially free from oxygen and water, the depolymerization may be carried out at a higher temperature than would otherwise be possible. Generally, depolymerization is carried out at a temperature between about 180° C. and about 280° C. After equilibrium is reached, the macrocyclic oligoesters are separated from the product solution by cooling the solution to between about 50° C. and about 100° C. to induce precipitation of the linear polyester, followed by filtration to remove insoluble residues. The macrocyclic oligoesters are recovered by evaporation of the resulting filtrate to remove any solvent. The recovered macrocyclic oligoesters typically contain between about 5% and less than about 0.5% polyester linears. Hydroxybutyl terminated oligomers and carboxylic acid-terminated oligomers are typically produced when preparing macrocyclic oligoesters by depolymerization. See, e.g., U.S. Pat. No. 5,407,984 to Brunelle et al. and U.S. Pat. No. 5,668,186 to Brunelle et al.

It is also within the scope of the invention to process macrocyclic co- and higher order oligoesters using the methods of the invention. Therefore, unless otherwise stated, an embodiment of a composition, article, or process that refers to macrocyclic oligoesters also includes embodiments utilizing macrocyclic co-oligoesters and higher order oligoesters.

Removal of Acid Impurities

Impurities, including trace amount of acid impurities often present with macrocyclic oligoesters, may be removed according to methods described herein. Removal of acid impurities allows macrocyclic oligoesters to polymerize to form HMWPs. Ion exchange resins effectively and efficiently remove acid impurities from a solution of macrocyclic oligoester.

In one aspect, the invention generally features a method for removing acid impurities from a solution. In one embodiment, the method includes the step of contacting a solution containing an acid impurity, such as carboxylic acid-terminated monomer, oligomer, or polymer, with a basic ion exchange resin. The acid impurities are removed from the solution, resulting in a macrocyclic oligoester substantially free of these acid impurities.

Depolymerization reactions where linear polyesters are depolymerized in the presence of a catalyst to form macrocyclic oligoesters typically produce acid impurities that are purified according to methods of the invention. Acid impurities include carbocylic acid-terminated monomeric species, carboxylic acid-terminated oligomeric species, and carboxylic acid-terminated polymeric species. The monomeric, oligomeric, and polymeric species are typically ester based and may be present in small to trace amounts in the depolymerized product. The depolymerization reaction product solution may contain, for example, between about 1 percent by weight (wt %) and about 4 wt % macrocyclic oligoester in a solvent such as o-DCB and between about 0.2 mole percent (mol %) and about 8 mol %, acid impurities based on macrocyclic oligoesters present.

Ion exchange resins are well suited for removal of ions and are particularly well suited to removing ions found in low concentrations, and in particular, trace quantities. More than 99% of the capacity of an ion exchange material is found in the interior of the resin bead with the rest at the surface of the bead. Suitable ion exchange resin beads that may be employed to remove carboxylic acid-terminated polymers include beads ranging in size from about 16 US Mesh and about 50 US Mesh. Ion exchange resins may be gel resins or macroporous resins and may be acrylic-based or styrene-based, although acrylic-based resins are preferred in certain applications. An example of a polystyrene-based resin includes Amberlyst A21 available from Rohm & Hass (Philadelphia, Pa.), which is a styrene polymer crosslinked with divinyl benzene. Other examples of polystyrene-based resins include A100, PFA100A400, and A500, all available from Purelite (Bala Cynwyd, Pa.). An example of an acrylic-based resin includes Amberlite IRA-67, also available from Rohm & Hass, which is a polyacrylic acid and/or polyacrylate material. Other examples of polyacrylate-based resins include IRA-900.

Ion exchange resins that may be used to remove acid impurities according to the invention include basic ion exchange resins. In certain embodiments, the basic ion exchange resin is weakly basic. Weakly basic resins, e.g., resins having tertiary amine functionalities, act as an acid adsorber, removing strong acids from a solution by ionic interaction with and retaining the acid impurities on or within the resin. In some embodiments, the ion exchange resin contains tertiary amine functionalities. For example, Amberlite IRA-67 is a weakly basic anion resin. Weakly basic resins such as tertiary amine functionalized resins are preferable in certain applications because the acid impurity is trapped as an ammonium salt of the amine and nothing is released into the product stream. Strongly basic resins such as those with quatenary ammonium exchange sites may release water or proton into the product stream.

Solutions used in practicing the invention typically contain one or more solvents. Any solvent can be used as long as the desired purification can be achieved. Illustrative examples of solvents include o-DCB, o-xylene, tetramethylbenzene, naphthalene, methylnaphthalene, and diphenyl ether. Macrocyclic oligoesters are soluble in certain solvents. Preferred solubilities of macrocyclic oligoesters in solvents are between about 1 to 5%. Furthermore, suitable solvents should be easy to handle, do not cause column cracking, and thermally stable at processing temperature.

Figure 1:
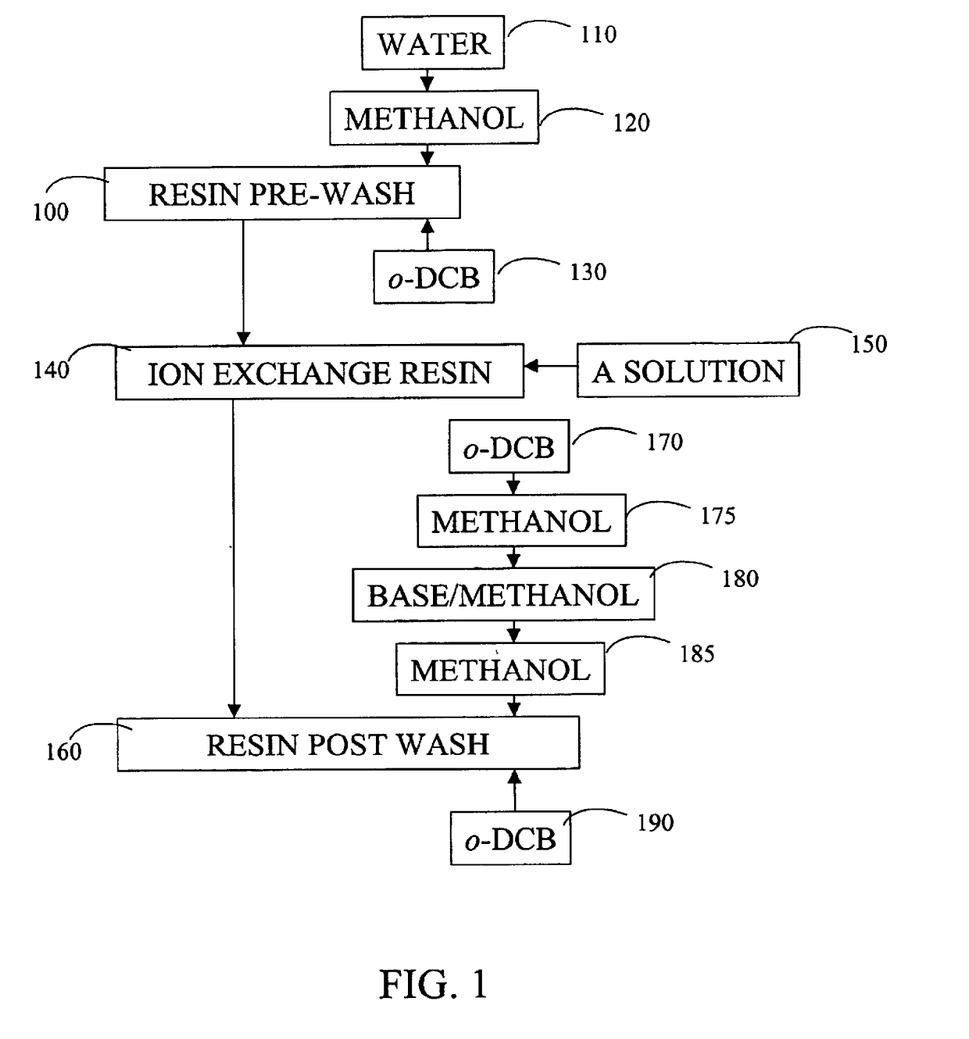
FIG. 1 is a schematic diagram of an embodiment of a purification process using ion exchange resins.

Referring to FIG. 1, a solution 150 that contains an acid impurity contacts an ion exchange resin 140. In one embodiment, the solution 150 is the product of a depolymerization reaction as described above. Optionally, the reaction product from a depolymerization may be cooled to cause precipitation of linear polyester, which then may be filtered out to provide the solution 150. In one embodiment, the depolymerization product is cooled to between about 10° C. and about 100° C., preferably between about 15° C. to about 80° C., more preferably between about 25° C. to about 60° C. The depolymerization reaction product is typically cooled for between about 30 minutes and about 24 hours, preferably about 9 to 15 hours, and more preferably about 12 hours, to precipitate out insoluble linear polyester from the reaction product.

When the solution 150 contacts the ion exchange resin 140, the solution 150 and/or the ion exchange resin 140 may be held at a temperature between about 15° C. to about 100° C., preferably between about 25° C. to about 70° C., more preferably between about 35° C. to about 60° C. The ion exchange resin 140 may be held in a column, for example a jacketed, i.e., an insulated, column. The quantity of ion exchange resin 140, the quantity of solvent and in embodiments employing a column, the column size, may be varied according to the particular application.

For example, a 1 cm inside diameter (ID) and 20 cm long jacketed column may be employed. Typical length/diamether ratios of columns that may be employed fall within the range from about 5 to about 20. A larger column having the same length/diameter ratio is expected to provide a substantially similar purification result. For example, a larger column can be designed having the capacity of treating 10,000 L/hour to 300,000 L/hour of a solution having 20–60 g/L of macrocyclic oligoesters.

The solution 150 may be passed over the ion exchange resin 140 at an average flow rate ranging from about 2 bed volumes/hour to about 20 bed volumes/hour, preferably from about 4 bed volumes/hour to about 8 bed volumes/hour, more preferably about 6 bed volumes/hour.

The solution 150 may be passed over the ion exchange resin 140 until "breakthrough of acids," i.e., the point at which detectable amount of acids exits the column. Typically, by passing the solution 150 through a second column, the risk of acid leakage is minimized as the second column can catch the leaked acid. In such an arrangement, one can approach and even surpass the breakthrough of acid point without risking contaminating the product, allowing the first column to be run close to saturation before it is regenerated.

In some embodiments, two or more ion exchange resin columns or beds are provided in series. The solution is passed over the first ion exchange resin in the series, contained in the first column, the effluent from the first column travels to the second column and passes over the ion exchange resin contained in the second column. In one embodiment, the second column in the series removes the acid impurities present in the solution after the breakthrough of acids occurs in the first column. The second column "polishes" the solution, e.g., capturing any residual acid or due to leakage at the early column.

The running time is dependent on the average flow rate, the concentration of materials and the resin employed. The solution 150 may be passed over the ion exchange resin 140 for between about 1 hour and about 40 hours, preferably between about 3 hours and about 10 hours, more preferably about 6 hours. In one embodiment, the breakthrough of acids is detected at the top of the column holding the ion exchange resin as the flow is upward. In another embodiment, the breakthrough of acids is detected at the bottom of the column as the flow is downward.

The performance of a column may be monitored by sampling the solution 150 coming out of the column 140 and performing an assay for acid content. For example, suitable methods of acid detection include a calorimetric titration procedure. A calorimetric titration is carried out by adding a dilute solution of an organic dye to a known weight of solution until a color change indicates all acid in the sample has been consumed. An example of an organic dye is $C_{18}H_{37}$—$(NC_5H_4)$=CH—CH=$(C_6H_4)$=O, molecular weight of 449.7 g/mole. The dye forms a deep blue solution when dissolved in a solvent, e.g., in o-DCB at 100 mg/L (0.00017M). When in the presence of an acid, the dye appears yellow enabling the detection of acids. The dye is added to the macrocyclic oligoester solution until the yellow color is titrated to green or blue. Once titration reveals a green or blue color the quantity of acid may be calculated based upon the amount of dye used in the titration.

In some embodiments, ion exchange resin is provided in a manner to enable continuous removal of acid impurities. For example, more than two columns are employed concurrently in a continuous removal process. For example, three columns are employed where one serves as the primary (or lead) column, one serves as the backup (or polish) column, and the third column is being regenerated. When the primary column becomes saturated, i.e., reaches the breakthrough of acids, the backup column becomes the primary column and the regenerated column becomes the backup while the saturated column is regenerated. In this way, removal of acid impurities may be carried out continuously on a large scale.

Techniques described herein allow the preparation of macrocyclic oligoesters substantially free of acid impurities, such as carboxylic acid-terminated species. In one embodiment, the solution collected exiting the ion exchange resin is substantially free of acid impurities. As used herein, "substantially free of acid impurities" means that the weight percentage of acid impurities is less than about 0.2 mol %, preferably less than about 0.02 mol %, and more preferably less than about 0.001 mol %. Macrocyclic oligoesters substantially free of acid impurities are capable of polymerization to HMWPs.

The purified macrocyclic oligoesters may be isolated from the solution exiting the resin by removing the solvent. Techniques for isolating macrocyclic oligoesters from the solution include concentrating the product to dryness by evaporator, e.g., by Rotary Evaporationfollowed by crystallization and filtration.

The macrocyclic oligoesters isolated from the solution that are substantially free of acid impurities may be compounded with a polymer catalyst and polymerized to form HMWPs. Typically, the isolated macrocyclic oligoester polymerizes to a HMWP that is about two to about four times the molecular weight of a polymerization product of the same macrocyclic oligoester isolated from a depolymerization reaction without removing acid impurities. For example, the macrocyclic oligoesters that were substantially free of acid impurities polymerized to over 160,000 g/mole whereas macrocyclic oligoesters containing acid impurities polymerized to about 70,000 g/mole under identical polymerization conditions.

The thermal and oxidative stability of the macrocyclic oligoesters isolated after removal of carboxylic acid-terminated polymers may be evaluated by melting a portion of the purified macrocyclic oligoester in a test tube and evaluating the color and viscosity of the sample. A thermally and oxidatively stable macrocyclic oligoester should remain colorless and retain its low viscosity in the molten state for at least about 2 hours, preferably for more than about 8 hours. The macrocyclic oligoesters isolated according to methods described herein are stable at a temperature between about 160° C. and about 260° C. and preferably between about 190° C. and about 220° C.

In another aspect, the invention generally features a method of preparing a macrocyclic oligoester. In one embodiment, the method includes the step of providing a solution of a macrocyclic oligoester containing an acid impurity. The solution is contacted with a basic ion exchange resin. The macrocyclic oligoester substantially free of the acid impurity then is collected. The acid impurity may be a carboxylic acid-terminated monomer, oligomer, or polymer and are typically ester based. In one embodiment, the macrocyclic oligoester is a macrocyclic oligoester of 1,4-butylene terephthalate. In another embodiment, the macrocyclic oligoester is a macrocyclic oligoester of ethylene terephthalate. In yet another embodiment, the solution is a macrocyclic co-oligoester of 1,4-butylene terephthalate and ethylene terephthalate.

In still another aspect, the invention generally features a method of preparing a solution of a macrocyclic oligoester. In one embodiment, the method includes the step of providing a linear polyester and a depolymerization catalyst. The linear polyester and the depolymerization catalyst are contacted to produce a solution of macrocyclic oligoester. The reaction solution also contains one or more acidic species, such as carboxylic acid-terminated polymers. This solution is contacted with a basic ion exchange resin to remove the acid impurities, resulting in a macrocyclic oligoester that is substantially free of acid impurities, which is then collected.

In still another aspect, the invention generally features a method of preparing a macrocyclic oligoester. In one embodiment, a linear polyester such as a poly(1,4-butylene terephthalate), a poly(ethylene terephthalate), or their copolyester is provided. A depolymerization catalyst is contacted with the linear polyester to produce a solution of a macrocyclic oligoester. The reaction solution also contains an acid impurity, e.g., carboxylic acid-terminated polyester. The solution of the macrocyclic oligoester including an acid impurity is contacted with an ion exchange resin. In some embodiments, the ion exchange resin is a tertiary amine-functionalized polystyrene. In some other embodiments, the ion exchange resin is a tertiary amine-functionalized polyacrylate. A macrocyclic oligoester substantially free of acid impurities is produced by contacting the solution with the ion exchange resin.

Referring again to FIG. 1, prior to being contacted with solution 150, the ion exchange resin 140 may be pre-washed 100. In one embodiment, the ion exchange resin is pre-washed with water 110 followed by an alcohol, such as methanol 120, which extracts any remaining water from the ion exchange resin. Thereafter, the ion exchange resin is washed with a solvent, for example, o-DCB 130.

The ion exchange resin may be packed in a column. The ion exchange resin is pre-washed with water which usually is provided in the down flow direction, e.g., from the top of the column exiting at the bottom of the column, followed by an alcohol, also provided in the down flow direction. Thereafter, the ion exchange resin is washed with a solvent which typically is provided in the up flow direction, e.g., from the bottom of the column exiting the top of the column. The number of washing steps, the order of the washing steps and the flow direction of each wash may be varied in the resin pre-wash.

In one embodiment, during the resin pre-wash process, the ion exchange resin is held in a column, for example, a 1 cm ID 20 cm long jacketed column. In one example, the column is packed with 11.3 g. of Amberlite IRA-67 resin and then washed in the down flow direction with 100 mL of water. The column may then be washed in the down flow direction with 100 mL of alcohol, e.g., methanol, to extract the water. Finally the ion exchange resin may be washed in the up flow direction with 100 mL o-DCB. At this point in the resin pre-wash, the ion exchange resin beads float in the solvent, o-DCB. In one embodiment, the volume of the resin in o-DCB is 14 mL.

In another embodiment, not shown, the resin pre-wash includes removing all water from the resin followed by washing the resin with solvent, such as o-DCB. In one embodiment, ion exchange resin is held in a column, such as a 1 cm ID and 20 cm long jacketed column. Any water present in the resin is removed by drying the ion exchange resin under vacuum at a temperature of between about 40° C. and about 120° C., preferably between about 60° C. and about 100° C., more preferably about 80° C. After the ion exchange resin is free of water, the resin is washed with a solvent, e.g., o-DCB, which is provided in the up flow direction. After the resin pre-wash is complete, the ion exchange resin may be contacted with solution.

Regeneration of Ion Exchange Resins

Ion exchange resins employed in accordance with the invention contact a solution containing carboxylic acid-terminated polymers and remove the acid impurities, e.g., carboxylic acid-terminated species from the solution. During the removal process, the ion exchange resin adsorbs the acid impurities and gradually loses its adsorption capacity until the column saturation occurs, i.e., when acid impurities start passing through the column without being adsorbed by the resins. At this point, the resins no longer remove any acid impurities from the macrocyclic oligoester solution.

In another aspect, the invention generally features a method of regenerating an ion exchange resin. In one embodiment, the invention features a method of regenerating a basic ion exchange resin that has been used to remove acid impurities. A basic ion exchange resin that previously contacted an acidic impurity, such as carboxylic acid-terminated polymer is contacted with a wash solution, e.g., washed, to regenerate a basic ion exchange resin that is substantially free of the acid impurity. In one embodiment, the basic ion exchange resin is weakly basic. The basic ion exchange resin may be a tertiary amine-functionalized polystyrene resin or a tertiary amine-functionalized polyacrylate.

Typically, a suitable wash solution to regenerate the basic ion exchange resin includes a base. Illustrative examples of bases that may be employed in a wash solution include trialkylamines, e.g., triethylamine, sodium hydroxide and potassium hydroxide. In one embodiment, the ion exchange resin is contacted with multiple wash solutions during a series of post wash steps. Suitable wash solutions employed during a series of post wash steps include, for example, water, a base (e.g., sodium hydroxide or potassium hydroxide), an alcohol (e.g., methanol), a solution of a base and an alcohol or a solution of a base and a solvent, and a solvent (e.g., o-DCB).

Figure 2:
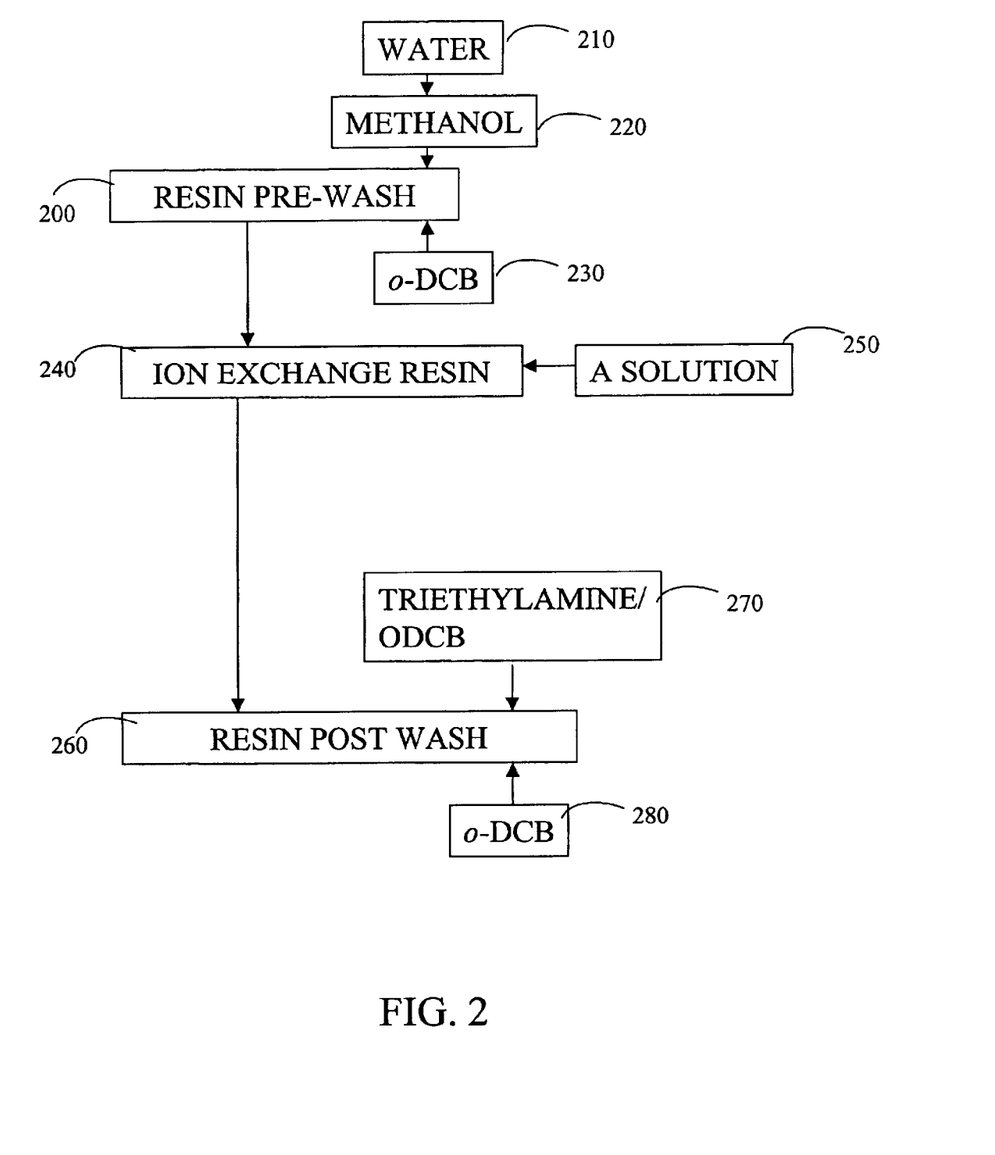
FIG. 2 is a schematic diagram of an embodiment of a purification process using ion exchange resins.

Referring now to FIG. 2, in one embodiment, after being used to remove acid impurities, the ion exchange resin may be put through a number of post wash steps 210. In one embodiment, the post wash 260 includes washing the resins with, in the down flow direction, a triethylamine solution in o-DCB 270. An advantage of using trialkylamine is the elimination of the need to switch solvents to accommodate the use of an alcohol during the wash. An o-DCB wash can follow a wash with triethylamine solution in o-DCB, for example. The wash with o-DCB 280 may be provided in the up flow direction. In contrast, when a methanol solution of sodium hydroxide is used, for example, the column needs to be washed with methanol before it is washed with o-DCB. The number of post washing steps, the order and the flow direction of each step may be varied in the resin post wash 260 to achieve optimal acid impurity removal.

Where a solution of a base and an alcohol are employed as a wash solution, a suitable weight percentage of base in solution may range from about 0.2 wt % to about 25 wt %, preferably from about 1 wt % to about 10 wt %, more preferably from about 0.5 wt % to about 2 wt %. Similarly, where a solution of a base and a solvent (e.g., triethyl amine in o-DCB) are employed as a wash solution, a suitable weight percentage of base in solution may range from about 0.2 wt % to about 25 wt %, preferably from about 1 wt % to about 10 wt %, more preferably from about 0.5 wt % to about 2 wt %.

In one embodiment, the acid impurity is carboxylic acid-terminated monomer, oligomer, or polymer and is adsorbed as an acid-terminated linear species by a tertiary amine-functionalized polystyrene resin or a tertiary amine-functionalized polyacrylate. After adsorption by the resin, the tertiary amine of the resin is converted to an ammonium carboxylate. A dilute solution of a strong base such as sodium hydroxide or potassium hydroxide dissolved in a solvent such as methanol may be employed to regenerate the tertiary amine in the resins. The quantity and concentration of dilute solution are selected to force the functional groups on the resin back to the free amine form.

Alternatively, a more concentrated solution of a base, such as ammonia or a trialkylamine, e.g., triethylamine, may be dissolved in a solvent such as, e.g., o-DCB. In one embodiment, about 1 molar equivalent of a strong base may be used to regenerate the tertiary-amine functionalities of resin.

Referring again to FIG. 1, after being used to remove acid impurities, the ion exchange resin may be put through a number of post wash steps 160. In one embodiment, the post wash 160 includes providing solvent, for example, o-DCB 170, in the down flow direction. Thereafter, additional post wash steps provided in the down flow direction may include washes with methanol 175, a solution of a base and methanol 180, and then methanol 185. Finally o-DCB 190 may be provided in the up flow direction. The number of washing steps, the order of the washing steps and the flow direction of each step may be varied in the resin post wash 160 to achieve optimal results.

The volume of each wash solution in each post wash step may be selected according to the quantity of resins and, in embodiments where a column is employed, the size of the column. For example, when a jacketed column having a 1 cm inner diameter and a length/diameter ratio of 20 is employed, the volume of wash solution in each post wash step may range from about 10 mL to about 200 mL, preferably from about 30 mL to about 150 mL, and more preferably from about 40 mL to about 100 mL.

In one embodiment, during the resin post-wash process, the ion exchange resin is held in a column. For example, a 1 cm ID jacketed column with a length/diameter ratio of 20 may be packed with 11.3 g of Amberlite IRA-67 resin. The post wash may include, in the down flow direction, washes with 40 mL of o-DCB, 40 mL of a solution of a base and methanol (e.g., a solution of 3% sodium hydroxide in methanol) and 40 mL of methanol. Thereafter, 40 mL of o-DCB is used to wash the column in the up flow direction. Similarly, a 1 cm ID jacketed column with a length/diameter ratio of 20 may be packed with 9.6 g Amberlite IRA-67 resin. The resin post wash may include providing, in the down flow direction, washes with 50 mL of o-DCB, 50 g of a solution of a base and methanol (e.g., 2% sodium hydroxide in methanol) and 100 mL of methanol. Finally, 100 mL of o-DCB is used to wash the column in the up flow direction.

Ion exchange resins regenerated according to methods described herein perform substantially identical to ion exchange as received from a supplier. When a solution of macrocyclic oligoester containing a carboxylic acid-terminated polymer is passed over the regenerated ion exchange resins, the acids are removed and the resulting solution is substantially free of carboxylic acid-terminated polymers. The macrocyclic oligoesters substantially free of acid impurities then may be isolated from the solution. Macrocyclic oligoesters purified may be polymerized to form HMWPs of higher molecular weight, which can be about 2 to 4 times the molecular weight of a polymerization product of the same macrocyclic oligoester isolated from a depolymerization reaction without removing acid impurities. Additionally, macrocyclic oligoesters purified with a regenerated resins are also melt stable.

EXAMPLES

The following examples are provided to further illustrate and to facilitate the understanding of the invention.

Example 1

Removal of Acid Impurities from a CBT Solution Using Amberlite IRA-67

A 1 cm ID, 20 cm long jacketed column available from Ace Glass (Vineland, N.J.) was packed in water with 11.3 g of Amberlite IRA-67 ion exchange resin as received from Rohm & Haas (Philadelphia, Pa.). The ion exchange resin in the column was pre-washed. First, 100 mL of water was provided in the down flow direction. Then, 100 mL of methanol washed the column in the down flow direction to extract any water remaining on the resin. Finally, 100 mL of o-DCB was provided in the up flow direction until the volume of the o-DCB in the packed bed was 14 mL, and the ion exchange resin floated in the o-DCB.

A depolymerization reaction was conducted to provide a macrocyclic butylene terephthalate (CBT) solution by depolymerizing polyester linears. Insoluble polyester linears were precipitated from the reaction product solution by bringing the reaction product to 25° C. The insoluble linear polyesters were filtered from the product solution to provide the solution to be purified by ion exchange. After filtering, the product solution contained about 2.84% by weight macrocyclic oligoesters in o-DCB and about 0.59 mmol/L or 0.35 mol % of acid impurities based on macrocyclic oligoesters. The solution was passed through the column at 25° C. and at an average flow rate of about 92 g/hour (1.17 mL/min or 5 bed volumes/hour). The solution was passed through the bed for about 35 hours, at which point breakthrough of acids was detected off the top of the column. During the 35 hours, 3.22 kg of solution (2.47 L) containing 91 g of macrocyclic oligoesters was passed over the column and 1.45 mmol of acid impurities were absorbed by the ion exchange resin in the column. The solution exiting the column was dried on a Rotary Evaporator, isolating the macrocyclic oligoesters.

A portion of the isolated macrocyclic oligoesters (0.5 g) was melted in a test tube at about 190° C. and remained as a colorless, low viscosity liquid for over two hours indicating that the material was melt stable. Another portion of the macrocyclic oligoesters were compounded with 0.3 mol % of Fascat 4101 catalyst and polymerized to over 160 k MW in 20 minutes at 190° C. For comparison, macrocyclic oligoesters isolated from the crude reaction filtrate polymerized to about 70 k MW under identical conditions.

Example 2

Regeneration of Clean Amberlite IRA-67

After breakthrough of acids described above in Example 1, the column and the ion exchange resin were post-washed to regenerate the ion exchange resin. The ion exchange resin was washed with 40 mL o-DCB in the down flow direction, sequentially followed by 40 mL of methanol, 40 mL of a solution of 3% NaOH in methanol, and 40 mL of methanol, all provided in the down flow direction. Finally, 40 mL of o-DCB was provided in the up flow direction.

Example 3

Removal of Acid Impurities from a CBT Solution Using Regenerated Amberlite IRA-67

The solution described above in Example 1, containing 2.84% by weight macrocyclic oligoesters in o-DCB and 0.59 mmol/L of acid or 0.35 mol % acid based on macrocyclic oligoesters was passed through the regenerated column at about 25° C. and at an average flow rate of about 110 g/hour or 6 bed volumes/hour). The solution was passed through the bed for 24 hours at which point no breakthrough of acids was detected off the top of the column. The solution exiting the column was isolated on a Rotary Evaporator and evaluated for melt stability and the degree of polymerization, as described above in Example 1. The performance of the macrocyclic oligoesters purified with regenerated ion exchange resin was identical to the performance of the macrocyclic oligoesters that was purified with the new ion exchange resin as received from the manufacturer. For example, the isolated material was melt stable. When compounded with 0.3 mol % of Fascat 4101 catalyst, the isolated material polymerized to over 160K Mw in 20 minutes at 190° C.

Example 4

Removal of Carboxylic Acid from a CBT Solution at Higher Temperature and Throughput of Solution Using the Ion Exchange Resin Amberlite IRA-67

A 1 cm ID jacketed column was loaded with 9.6 g of dried Amberlite IRA-67 ion exchange resin as received from Rohm & Haas. The resin was dried under vacuum at 80° C. to remove all free water. Prior to drying the resin weighed 14.4 g. Next, o-DCB was provided to fill the column in the up flow direction. After filling the column with solvent, the resin was wet and packed in the column, giving a bed virtually free of voids. The volume of the resin bed in the column was 13.3 mL.

The product of a depolymerization reaction was then brought to about 70° C. to precipitate insoluble linear polyester. The insoluble linear polyesters were then filtered from the reaction product to provide the solution to be purified by ion exchange. After filtering, the solution contained about 2.80% by weight macrocyclic oligoesters in o-DCB and contained about 1.32 mmol/L or 0.67 mol % acid impurities based on macrocyclic oligoesters. The solution was passed through the column at 60° C. at an average flow rate of 92 g/hour (1.17 mL/min or 5.3 bed volumes/hour).

The solution was passed through the bed for 6 hours until breakthrough of acids was detected off the top of the column. During the 6 hours, 3.72 kg of solution (2.85L) containing 104 g of macrocyclic oligoesters was passed over the column and 3.14 mmol of acid was adsorbed by the column while 0.62 mmol of acid leaked into the effluent. The solution continued to be passed through the bed until about 40 hours at which point the concentration of acid off the top of the column was about 0.45 mmol/L indicating that about 34% of the acid in the solution was leaking through the column.

The amount of acid was detected by sampling the solution and effluent in a vial and performing colorimetric titration on the sample. A measured quantity of a dilute solution of a dye solution having the structure $C_{18}H_{37}$—$(NC_5H_4)$=CH—CH=$(C_6H_4)$=O (molecular weight=449.7 g/mole) was added drop wise to the amount of the sample in the vial until a color change indicated all the acid in the sample was consumed. According to this assay, the dye appeared yellow in the presence of acid, enabling detection of acid. The dye formed a deep blue solution when dissolved in a solvent, (e.g., o-DCB at 100 mg/L or 0.00017M). Accordingly, the dye was added to the solution and the effluent until the yellow color was titrated to green or blue. Once titration revealed a green or blue color the quantity of acid was calculated based upon the amount of dye used in the titration. Data from this experiment is provided in Table 1, below.

TABLE 1

Data from Acid Measurements

| Sample | Amt sample | Amt macrocyclic oligoesters in sample | Dye soln 0.00017 mmol/g | Acid in soln (mmol/L) | Acid in macrocyclic oligoesters (mol %) |
|---|---|---|---|---|---|
| Solution feed | 0.192 g | 5.38 mg | 1.14 | 1.32 | 0.67 |
| Effluent 1 hour | 1.02 g | 28.6 mg | <.02 | <.005 | <.0025 |
| Effluent 6 hours | 1.12 g | 31.4 mg | 0.053 | 0.01 | 0.05 |
| Effluent 40 hours | 0.369 g | 10.3 mg | 0.774 | 0.466 | 0.23 |
| Combined Effluent | 0.273 g | 7.64 mg | 0.271 | 0.218 | 0.11 |

Example 5

Regeneration of Amberlite IRA-67 Used in Experiment 4

After the experiment illustrated in Example 4 was completed, the column and the ion exchange resin were post-washed to regenerate the ion exchange resin. The ion exchange resin was washed with 50 mL o-DCB in the down flow direction, sequentially followed by 50 g of a solution of 2% NaOH in methanol, and 100 mL of methanol, all provided in the down flow direction. Finally, 100 mL of o-DCB was provided in the up flow direction.

Example 6

Treatment of Effluent from Example 4 to Mimic Polishing Column

The combined effluent from Table 1 and described in Example 4 which contained 0.218 mmol/L acids was pumped at a rate of 280 g/hour (3.6 mL/min or 16 bed volumes/hour) through the column with the regenerated ion exchange resin described in Example 5. The regenerated ion exchange resin column was heated to 70° C. The acids were removed to non-detectable levels (<0.01 mmol/L) in the effluent. Based on the acid levels in this column effluent, regeneration was effective. The regenerated column was able to adsorb acid impurities at about 70° C. at higher throughput rates relative then attempted in the other examples.

Example 7

Results of Polymerization of Macrocyclic Oligoesters with and without Removing Acid Impurities.

Table 2 illustrates macrocyclic oligoesters polymerized in test tubes at 190° C. (0.3 g scale) for 1 hour by melting macrocyclic oligoester compositions, which were compounded with 0.3% of Fascat 4101. Polymerized macrocyclic oligoesters were characterized using GPC which was calibrated using polystyrene standards.

TABLE 2

| | Polymerization |
|---|---|
| Sample Description | GPC Mw vs Polystyrene |
| Valox 315 commercial PBT used in depolymerization | 113K |
| Solution fed into column | 130K |
| Isolated Macrocyclic oligoesters Example 4 effluent 1–2 hours | >200K |
| Isolated Macrocyclic oligoesters from Example 6 | >200K |

Example 8

Removal of Acid Impurities and Resin Regeneration

A SS316 fixed resin bed is packed with about 10 ml (about 4.2 grams) A100 resin (Purolite, Bala Cynwyd, Pa.). Prior to packing the A100 resin is methanol-washed and oven dried. The A100 resin is packed on a plug of glass wool within the resin bed. The glass wool plug is employed to prevent fluidization. The system is fed, in a continuous manner from the top of the packed bed, with a loading solution of 10 grams/L macrocyclic oligoester in o-DCB solution (containing about 0.845 wt % acid impurities based on macrocyclic oligoesters). The resin bed has an oil jacket, which enables the macrocyclic oligoester in o-DCB solution to be loaded onto the resin at 70° C. The macrocyclic oligoester in o-DCB solution is fed at a Liquid Hourly Space Velocity (LHSV) of 1. Acid breakthrough is observed from product sampled from the bottom of the resin bed after about 16 hours.

The resin is regenerated when acid breakthrough is observed. The heat is removed and the resin is washed in o-DCB for about 2 hours to remove acid species from the resin. After the o-DCB wash, the o-DCB is replaced with 40 grams of triethylamine in each liter of o-DCB solution. The triethylamine in o-DCB solution is fed into the packed bed at room temperature at a LHSV of about 2. The flow direction of the triethylamine in o-DCB solution into the packed bed is reversed. Thus, the system is fed from the bottom of the packed bed at room temperature, and the effluent exits from the top of the packed bed. The effluent contains acid that is being removed from the resin. The effluent contains no acid after about eight hours. Finally, o-DCB is fed in the forward flow direction for two hours.

The loading cycle is repeated and the system is fed, in a continuous manner from the top of the packed bed, at a LHSV of 1 with a loading solution of macrocyclic oligoester in o-DCB solution (containing about 0.845 wt % acid impurities based on macrocyclic oligoesters).

This loading and regenerating cycle is then repeated at least 15 times without observable deactivation of the resin and without earlier breakthrough of acids. Where the acid impurities are at a lower level (e.g., 0.2 mol %), any deactivation of the resin occurs after more cycles than when a higher concentration of acid impurities are present.

Each of the patent and patent application documents disclosed hereinabove is incorporated herein by reference in its entirety.

Variations, modifications, and other implementations of what is described herein will occur to those of ordinary skill in the art without departing from the spirit and the scope of the invention as claimed.

What is claimed is:

1. A method of removing an acidic impurity from a solution, the method comprising the step of contacting a solution comprising a macrocyclic oligoester and an acidic impurity with a basic ion exchange resin, wherein the macrocyclic oligoester comprises a structural repeat unit of formula (I):

wherein R is an alkylene, a cycloalkylene, or a mono- or polyoxyalkylene group;
and A is a divalent aromatic or alicyclic group.

2. The method of claim 1 wherein the solution comprises a macrocyclic oligoester of 1,4-butylene terephthalate.

3. The method of claim 1 wherein the solution comprises a macrocyclic oligoester of ethylene terephthalate.

4. The method of claim 1 wherein the solution comprises a macrocyclic co-oligoester.

5. The method of claim 1 wherein the acidic impurity comprises a carboxylic acid-terminated monomeric, a carboxylic acid-terminated oligomeric, or a carboxylic acid-terminated polymeric species.

6. The method of claim 1 wherein the solution comprises reaction products of a linear polyester and a depolymerization catalyst.

7. The method of claim 1 wherein the solution comprises a solvent selected from the group consisting of o-dichlorobenzene, o-xylene, tetramethylbenzene, naphthalene, methylnaphthalene, and diphenyl ether.

8. The method of claim 5 wherein the acidic impurity comprises carboxylic acid-terminated monoester, carboxylic acid-terminated oligoester, or carboxylic acid-terminated polyester.

9. The method of claim 8 wherein the carboxylic acid-terminated linear polyester comprises at least one of a carboxylic acid-terminated poly(1,4-butylene terephthalate) and a carboxylic acid-terminated poly(ethylene terephthalate).

10. The method of claim 1 further comprising the step of regenerating a basic ion exchange resin to form a regenerated ion exchange resin substantially free of the acidic impurity.

11. The method of claim 10 wherein the regenerating step comprises contacting basic ion exchange resin that previously contacted the acidic impurity with a wash solution.

12. The method of claim 11 wherein the contacting step comprises mixing basic ion exchange resin that previously contacted a carboxylic acid-terminated monoester, a carboxylic acid-terminated oligoester, or a carboxylic acid-terminated polyester and a wash solution.

13. The method of claim 11 wherein the contacting step comprises contacting basic ion exchange resin that previously contacted a carboxylic acid-terminated monoester, a carboxylic acid-terminated oligoester, or a carboxylic acid-terminated polyester with a continuous flow of a wash solution.

14. The method of claim 11 wherein the wash solution comprises a sodium hydroxide or a potassium hydroxide.

15. The method of claim 11 wherein the wash solution comprises a trialkylamine.

16. The method of claim 15 wherein the trialkylamine is triethylamine.

17. The method of claim 1 wherein the basic ion exchange resin comprises a weakly basic ion exchange resin.

18. The method of claim 17 wherein the weakly basic ion exchange resin comprises a tertiary amine-functionalized polystyrene resin or a tertiary amine-functionalized polyacrylate resin.

19. The method of claim 17 wherein the weakly basic ion exchange resin comprises a polyacrylic acid or a polyacrylate material.

20. The method of claim 1 wherein the solution comprises a trace amount of an acidic impurity.

21. A method of preparing a macrocyclic oligoester, comprising the steps of:
   (a) providing a solution of a macrocyclic oligoester, wherein the solution comprises a macrocyclic oligoester comprising a structural repeat unit of formula (I):

wherein R is an alkylene, a cycloalkylene, or a mono- or polyoxyalkylene group;
   and A is a divalent aromatic or alicyclic group, the solution comprising an acidic impurity;
   (b) contacting the solution with a basic ion exchange resin; and
   (c) collecting the macrocyclic oligoester substantially free of the acidic impurity.

22. The method of claim 21 wherein the acidic impurity comprises a carboxylic acid-terminated monomeric, a carboxylic acid-terminated oligomeric, or a carboxylic acid-terminated polymeric species.

23. The method of claim 21 wherein the solution comprises a macrocyclic oligoester of 1,4-butylene terephthalate.

24. The method of claim 23 wherein the solution of macrocyclic oligoester of 1,4-butylene terephthalate comprises a trace amount of a carboxylic acid-terminated monoester, a carboxylic acid-terminated oligoester, or a carboxylic acid-terminated polyester.

25. The method of claim 21 further comprising the step of:
   (d) regenerating a basic ion exchange resin substantially free of the acid impurities.

26. The method of claim 25 wherein the regenerating step (d) comprises contacting basic ion exchange resin that previously contacted the acidic impurity with a wash solution.

27. The method of claim 26 wherein the contacting step comprises contacting basic ion exchange resin that previously contacted the acidic impurity with a continuous flow of a wash solution.

28. The method of claim 26 wherein the wash solution comprises a base.

29. The method of claim 28 wherein the wash solution comprises a trialkylamine.

30. The method of claim 29 wherein the trialkylamine is triethylamine.

31. The method of claim 25 further comprising the step of (e) washing the basic ion exchange resin substantially free of the acidic impurity with a solvent comprising o-dichlorobenzene or methanol.

32. The method of claim 21 wherein the basic ion exchange resin comprises a weakly basic ion exchange resin.

33. A method of preparing a solution of a macrocyclic oligoester comprising a structural repeat unit of formula (I):

wherein R is an alkylene, a cycloalkylene, or a mono- or polyoxyalkylene group;
and A is a divalent aromatic or alicyclic group, the method comprising the steps of:
   (a) providing a linear polyester;
   (b) providing a depolymerization catalyst;
   (c) contacting the linear polyester with the depolymerization catalyst to produce a solution of a macrocyclic oligoester, the solution further comprising an acidic impurity selected from the group comprising a carboxylic acid-terminated monoester, a carboxylic acid-terminated oligoester, or a carboxylic acid-terminated polyester;
   (d) contacting the solution of the macrocyclic oligoester with a basic ion exchange resin; and
   (e) collecting the macrocyclic oligoester substantially free of the acidic impurity.

34. The method of claim 33 further comprising the step of:
   (f) regenerating a basic ion exchange resin substantially free of the acidic impurity.

35. A basic ion exchange resin substantially free of acid impurities prepared by the method of claim 34.

36. A method of preparing a high molecular weight polyester, comprising the steps of:
   (a) providing a solution comprising a macrocyclic oligoester and an acidic impurity, wherein the macrocyclic oligoester comprises a structural repeat unit of formula (I):

wherein R is an alkylene, a cycloalkylene, or a mono- or polyoxyalkylene group;
   nd A is a divalent aromatic or alicyclic group;
   (b) contacting the solution with a basic ion exchange resin to form a solution of macrocyclic oligoester substantially free of the acidic impurity; and
   (c) polymerizing the macrocyclic oligoester substantially free of the acidic impurity.

37. The method of claim 36 further comprising the step of:
   (d) providing a polymerization catalyst.

38. The method of claim 37 further comprising the step of:
   (e) contacting the solution of macrocyclic oligoester substantially free of the acidic impurity with a polymerization catalyst at an elevated temperature.

39. The method of claim 36 wherein step (a) further comprises:
providing a linear polyester;
providing a depolymerization catalyst; and
contacting the linear polyester with the depolymerization catalyst to produce the solution comprising a macrocyclic oligoester and an acidic impurity.

40. The method of claim 36 wherein the acidic impurity is selected from the group consisting of a carboxylic acid-terminated monoester, a carboxylic acid-terminated oligoester, and a carboxylic acid-terminated polyester.

41. A method of preparing a macrocyclic oligoester comprising a structural repeat unit of formula (I):

(I)

wherein R is at least one of (i) a 1,4-butylene terephthalate and (ii) an ethylene terephthalate; and A is a divalent benzene group, the method comprising the steps of:

(a) providing a linear polyester comprising at least one of (i) a poly(1,4-butylene terephthalate) and (ii) a poly(ethylene terephthalate);

(b) providing a depolymerization catalyst;

(c) contacting the linear polyester with the depolymerization catalyst to produce a solution of a macrocyclic oligoester, the solution further comprising a carboxylic acid-terminated species; and (d) contacting the solution of the macrocyclic oligoester with an ion exchange resin comprising tertiary amine-functionalized polystyrene resin or a tertiary amine-functionalized polyacrylate resin, thereby producing the macrocyclic oligoester substantially free of carboxylic acid-terminated species.

42. The method of claim 41 further comprising the step of (e) contacting the basic ion exchange resin that previously contacted carboxylic acid-terminated polyester with a solution of a trialkylamine, thereby regenerating a basic ion exchange resin substantially free of the carboxylic acid-terminated species.

43. The method of claim 42 wherein the trialkylamine is a triethylamine.

* * * * *